United States Patent
Ahn et al.

(10) Patent No.: US 9,960,915 B2
(45) Date of Patent: May 1, 2018

(54) METHOD AND APPARATUS FOR PERFORMING CROSS-AUTHENTICATION BASED ON SECRET INFORMATION

(71) Applicants: Hyundai Motor Company, Seoul (KR); Kia Motors Corporation, Seoul (KR); Industry-Academic Cooperation Foundation, Chosun University, Gwangju (KR); SNU R&DB Foundation, Seoul (KR)

(72) Inventors: Hyun Soo Ahn, Seoul (KR); Ho Jin Jung, Seoul (KR); Jun Young Woo, Seoul (KR); Ho Youn Kim, Seoul (KR); Kang Seok Lee, Gyeonggi-do (KR); Jong Yoon Yoon, Gyeonggi-do (KR); Jong Seon No, Seoul (KR); Young Sik Kim, Gwangju (KR)

(73) Assignees: Hyundai Motor Company, Seoul (KR); Kia Motor Corporation, Seoul (KR); Industry-Academic Cooperation Foundation, Chosun University, Gwangju (KR); SNU R&DB Foundation, Seoul (KR)

( * ) Notice: Subject to any disclaimer, the term of this patent is extended or adjusted under 35 U.S.C. 154(b) by 14 days.

(21) Appl. No.: 14/790,599

(22) Filed: Jul. 2, 2015

(65) Prior Publication Data

US 2016/0277189 A1  Sep. 22, 2016

(30) Foreign Application Priority Data

Mar. 17, 2015  (KR) .................... 10-2015-0036940

(51) Int. Cl.
*H04L 9/32* (2006.01)
*H04L 9/08* (2006.01)

(52) U.S. Cl.
CPC .......... *H04L 9/0869* (2013.01); *H04L 9/3273* (2013.01); *H04L 2209/84* (2013.01)

(58) Field of Classification Search
CPC ........ H04L 9/32; H04L 9/0869; H04L 9/0847
See application file for complete search history.

(56) References Cited

U.S. PATENT DOCUMENTS 6,952,475 B1 * 10/2005 Horn .................. H04L 9/0844
380/30
2003/0070067 A1 * 4/2003 Saito .................. H04L 63/0435
713/150

(Continued)

FOREIGN PATENT DOCUMENTS

JP  H08-0156742 A  6/1996
JP  H11-091509 A   4/1999

(Continued)

OTHER PUBLICATIONS

Korean Office Action dated May 23, 2016 in connection with Korean Application No. 10-2015-0036940.

(Continued)

*Primary Examiner* — Mahfuzur Rahman
*Assistant Examiner* — Arya Golriz
(74) *Attorney, Agent, or Firm* — Mintz Levin Cohn Ferris Glovsky and Popeo, P.C.; Peter F. Corless

(57) ABSTRACT

A method of performing cross-authentication in a vehicle controller interworking with an external device includes: generating a random number S and transmitting the random number S to the external device according to an authentication request message received from the external device; generating a variable i using a first function having the random number S as a parameter; generating a first session key Ks using a second function having the variable i and a pre-stored secret key K as parameters; receiving a first response key from the external device; generating a second (Continued)

response key using a third function having the random number S, the variable i and the first session key Ks as parameters; and authenticating the external device based on whether the first response key is equal to the second response key.

39 Claims, 6 Drawing Sheets

(56) References Cited

U.S. PATENT DOCUMENTS

| | | | | |
|---|---|---|---|---|
| 2009/0094463 | A1* | 4/2009 | Boucher | G06F 12/1458 |
| | | | | 713/182 |
| 2011/0066856 | A1* | 3/2011 | Yao | H04L 9/3271 |
| | | | | 713/170 |
| 2011/0086658 | A1* | 4/2011 | Baldemair | H04J 13/0059 |
| | | | | 455/507 |
| 2011/0235806 | A1* | 9/2011 | Fukuda | H04L 9/0825 |
| | | | | 380/282 |
| 2014/0226813 | A1* | 8/2014 | Heffner | H04L 9/0819 |
| | | | | 380/44 |

FOREIGN PATENT DOCUMENTS

| | | |
|---|---|---|
| JP | 2005-080039 A | 3/2005 |
| JP | 2011-0164912 A | 8/2011 |
| JP | 2013-0155505 | 8/2013 |
| KR | 10-2014-0009665 A | 1/2014 |

OTHER PUBLICATIONS

Forouzan, "Cryptography and Network Security", The McGraw Hill Companies, 2008, ISBN 007-287022-2.

* cited by examiner

METHOD AND APPARATUS FOR PERFORMING CROSS-AUTHENTICATION BASED ON SECRET INFORMATION

CROSS-REFERENCE TO RELATED APPLICATION

This application claims priority to and the benefit of Korean Patent Application No. 10-2015-0036940, filed on Mar. 17, 2015, which is hereby incorporated by reference as if fully set forth herein.

BACKGROUND OF THE DISCLOSURE

Technical Field

The present disclosure relates generally to a method and apparatus for performing cross-authentication in a vehicle, and more particularly, to a method and apparatus for providing cross-authentication between a vehicle controller and an external device based on secret information.

Discussion of the Related Art

Many recently built vehicles include multiple electronic control devices for improving convenience and safety of drivers and enhancing in-vehicle communication networks among the electronic control devices. As the number of in-vehicle electronic controllers increases and interworking with external devices becomes possible, vehicle safety becomes increasingly paramount.

Accordingly, testing of electronic controllers can be performed to improve safety and reliability. In order to test a vehicle controller and update internal data of the vehicle controller, authentication of an external tester is required. Conventionally, in an authentication procedure between a vehicle controller and a tester, when the vehicle controller transmits a seed value to the tester in response to an authentication request of the tester, the tester generates a key value using the received seed value. The generated key value is then transmitted to an electronic controller, and the electronic controller permits access of the tester depending on whether the key value received from the tester is equal to a key value internally generated according to a predetermined algorithm. However, since the conventional seed key algorithm maintains security by keeping the algorithm for receiving the seed value and generating the key a secret, security may be jeopardized if the seed key algorithm is opened or analyzed.

SUMMARY OF THE DISCLOSURE

Accordingly, the present disclosure is directed to a method and apparatus for providing cross-authentication based on secret information that substantially obviate one or more problems due to limitations and disadvantages of the related art. An object of the present disclosure is to provide a method and apparatus for performing cross-authentication based on secret information. Another object of the present disclosure is to provide a method and apparatus for performing cross-authentication based on secret information, which is capable of performing cross-authentication based on a pre-shared secret key independent of a seed value.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of performing cross-authentication in a vehicle controller interworking with an external device includes: generating a random number S and transmitting the random number S to the external device in response to an authentication request message received from the external device; generating a variable i using a first function having the random number S as a parameter; generating a first session key Ks using a second function having the variable i and a pre-stored secret key K as parameters; receiving a first response key from the external device; generating a second response key using a third function having the random number S, the variable i and the first session key Ks as parameters; and authenticating the external device based on whether the first response key is equal to the second response key.

Furthermore, according to embodiments of the present disclosure, a method of performing cross-authentication in an external device interworking with a vehicle controller includes: transmitting an authentication request message to the vehicle controller; receiving a random number S from the vehicle controller; generating a variable i using a first function having the random number S as a parameter; generating a first session key Ks using a second function having the variable i and a pre-stored secret key K as parameters; generating a first response key using a third function having the random number S, the variable i and the first session key Ks as parameters; and transmitting the first response key to the vehicle controller.

Furthermore, according to embodiments of the present disclosure, an apparatus for performing cross-authentication with an external device includes: a communication unit configured to perform communication with the external device; a random number generator configured to generate a random number S in response to an authentication request message received from the external device; a repeat count generator configured to generate a variable i using a first function having the random number S as a parameter; a session key generator configured to generate a first session key Ks using a second function having the variable i and a pre-stored secret key K as parameters; a response key generator configured to generate a second response key using a third function having the random number S, the variable i and the first session key Ks as parameters, upon receiving a first response key from the external device; and an authentication unit configured to authenticate the external device based on whether the first response key is equal to the second response key.

Furthermore, according to embodiments of the present disclosure, an apparatus for performing cross-authentication with a vehicle controller includes: a communication unit configured to transmit an authentication request message to the vehicle controller and to receive a random number S from the vehicle controller; a repeat count generator configured to generate a variable i using a first function having the random number S as a parameter; a session key generator configured to generate a first session key Ks using a second function having the variable i and a pre-stored secret key K as parameters; a response key generator configured to generate a first response key using a third function having the variable i, the first session key Ks and the random number S as parameters; and an authentication unit configured to determine whether the first response key transmitted to the vehicle controller is equal to a third response key received from the vehicle controller and to authenticate the vehicle controller based on the determination.

Furthermore, according to embodiments of the present disclosure, a computer-readable recording medium containing program instructions for performing cross-authentication in a vehicle controller interworking with an external device includes: program instructions that generate a random number S and transmit the random number S to the external device in response to an authentication request message received from the external device; program instructions that generate a variable i using a first function having the random number S as a parameter; program instructions that generate a first session key Ks using a second function having the variable i and a pre-stored secret key K as parameters; program instructions that receive a first response key from the external device; program instructions that generate a second response key using a third function having the random number S, the variable i and the first session key Ks as parameters; and program instructions that authenticate the external device based on whether the first response key is equal to the second response key.

Furthermore, according to embodiments of the present disclosure, a computer-readable recording medium containing program instructions for performing cross-authentication in a vehicle controller interworking with an external device includes: program instructions that transmit an authentication request message to the vehicle controller; program instructions that receive a random number S from the vehicle controller; program instructions that generate a variable i using a first function having the random number S as a parameter; program instructions that generate a first session key Ks using a second function having the variable i and a pre-stored secret key K as parameters; program instructions that generate a first response key using a third function having the random number S, the variable i and the first session key Ks as parameters; and program instructions that transmit the first response key to the vehicle controller.

Accordingly, various embodiments based on technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
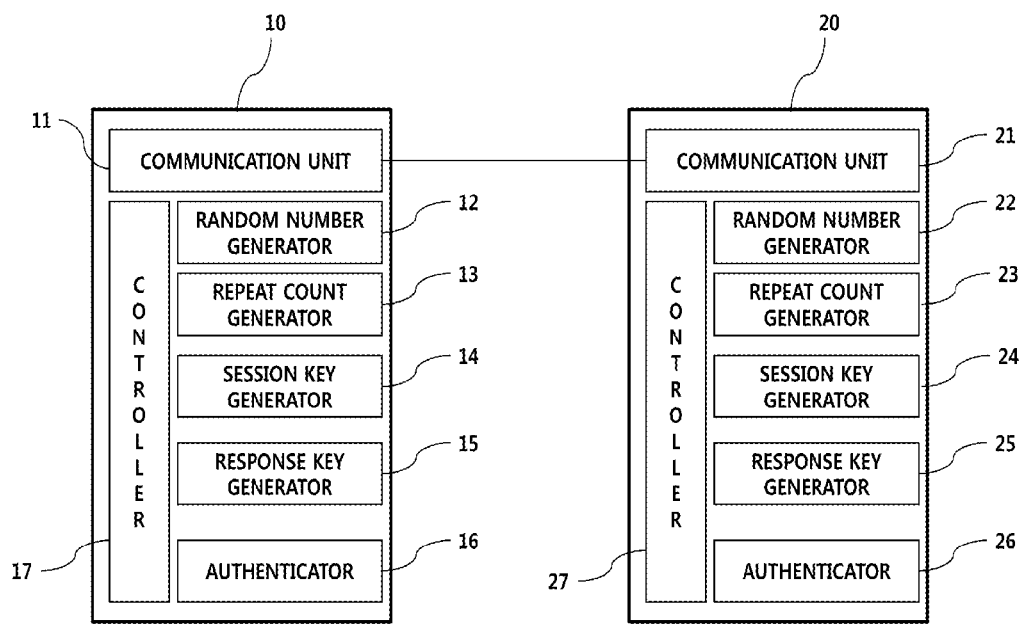
FIG. 1 is a diagram showing the configuration of a cross-authentication system based on secret information according to embodiments of the present disclosure.

Reference will now be made in detail to the embodiments of the present disclosure, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present disclosure are described as integrated into a single one or operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in a computer readable media such that the computer program is read and executed by a computer to implement embodiments of the present disclosure. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and the nature, order, or sequence of corresponding elements are not limited by these terms. It will be understood that when one element is referred to as being "connected to", "electrically connected to", or "coupled to" another element, one element may be "connected to", "electrically connected to", or "coupled to" another element via a further element although one element may be directly connected to or directly electrically connected to another element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a diagram showing the configuration of a cross-authentication system based on secret information according to embodiments of the present disclosure.

As shown in FIG. 1, the cross-authentication system may include an external device 10 and a vehicle controller 20. For example, the external device 10 may be a tester or on-board diagnostics (OBD) device for testing a vehicle state via a predetermined terminal or wireless connection. The external device 10 and the vehicle controller 20 may include communication units 11 and 21 for transmitting and receiving signals via wired or wireless connection, respectively.

In addition, the external device 10 and the vehicle controller 20 may include random number generators 12 and 22 for cross-authentication, repeat number generators 13 and 23, session key generators 14 and 24, response key generators 15 and 25, authenticators 16 and 26 and controllers 17 and 27 for controlling overall operation of the devices, respectively. The random number generators 12 and 22 may generate random numbers having a predetermined length. For example, the random number generator 12 of the external device 10 may generate a random number R having a predetermined length and transmit an authentication request message including the generated random number R to the vehicle controller 20. In addition, the random number generator of the vehicle controller 20 may generate a random number S having a predetermined length upon receiving the authentication request message.

The repeat count generators 13 and 23 may generate a variable i (hereinafter, this is used interchangeably with a repeat count i) which is a parameter for determining calculation complexity of an authentication algorithm and a security level using at least one of the random number R generated by the random number generator 12 of the external device 10 and the random number S generated by the random number generator 22 of the vehicle controller 20.

Hereinafter, a function for generating a variable i using at least one of the random number R and the random number S as a parameter is referred to as a first function $f_1$, for convenience of description.

For example, the repeat count i may be generated by Equation 1.

$$i = f_1(R,S) = L_s(R) + S \bmod 16, \qquad \text{Equation 1:}$$

where $L_s(R)$ may be a function for cyclic-shifting the random number R by the number of bits of the random number S. For example, if the order of bits of the random number R is $(x_{n-1}, x_{n-2}, \ldots, x_1, x_0)_2$, the function $L_s(R)$ may be cyclic-shifted to the left by the number of bits of the random number S to generate $(x_{n-s-1}, \ldots, x_1, x_0, x_{n-1}, x_{n-2}, \ldots, x_{n-s})_2$.

The session key generators 14 and 24 may generate a first session key Ks using a second function $f_2$ having the repeat count i, a pre-shared secret key K and the random number S as parameters. The session key generators 14 and 24 may generate a second session key $K_{S2}$ using the repeat count i the first session key Ks and a first response key $A_{Tester}$ or a second response key $A_{ECU}$.

The session key generation procedure will be described in detail with reference to FIGS. 3 and 4.

The response key generators 15 and 25 may receive at least one of the repeat count i, the session key K, the random number R and the random number S as a parameter and generate response keys. Hereinafter, for convenience of description, a function used to generate the response key is referred to as a third function.

For example, the response key generator 25 of the vehicle controller 20 may receive the repeat count i, the first session key Ks, the random number R and the random number S as parameters and generate the second response key $A_{ECU}$. Similarly, the response key generator 15 of the external device 10 may receive the repeat count i, the first session key Ks, the random number R and the random number S as parameters and generate the first response key $A_{Tester}$.

In addition, the response key generator 25 of the vehicle controller 20 may generate a third response key $B_{ECU}$ depending on whether the first response key $A_{Tester}$ and the second response key $A_{ECU}$ are equal, upon receiving the first response key $A_{Tester}$ from the external device 10. Similarly, the response key generator 15 of the external device 10 may generate a fourth response key $B_{Tester}$.

The response key generation procedure of the response key generators 15 and 25 will be described below in detail with reference to FIG. 5.

The authenticators 16 and 26 may determine whether the response key received from another device and the internally generated response key are equal to one another and determine whether authentication of another device is successful based on a result of the determination.

For example, the authenticator 16 of the external device 10 may determine that authentication of the vehicle controller 10 is successful, when the internally generated fourth response key $B_{Tester}$ and the third response key $B_{ECU}$ received from the vehicle controller 10 are equal. As another example, the authenticator 26 of the vehicle controller 20 may determine that authentication of the external device 10 is successful, when the first response key $A_{Tester}$ received from the external device 10 and the internally generated second response key $A_{ECU}$ are equal.

Accordingly, the external device 10 and the vehicle controller 20 according to the present disclosure may perform cross-authentication by generating the response keys using the pre-shared secret key and exchanging the generated response keys with each other.

Figure 2:
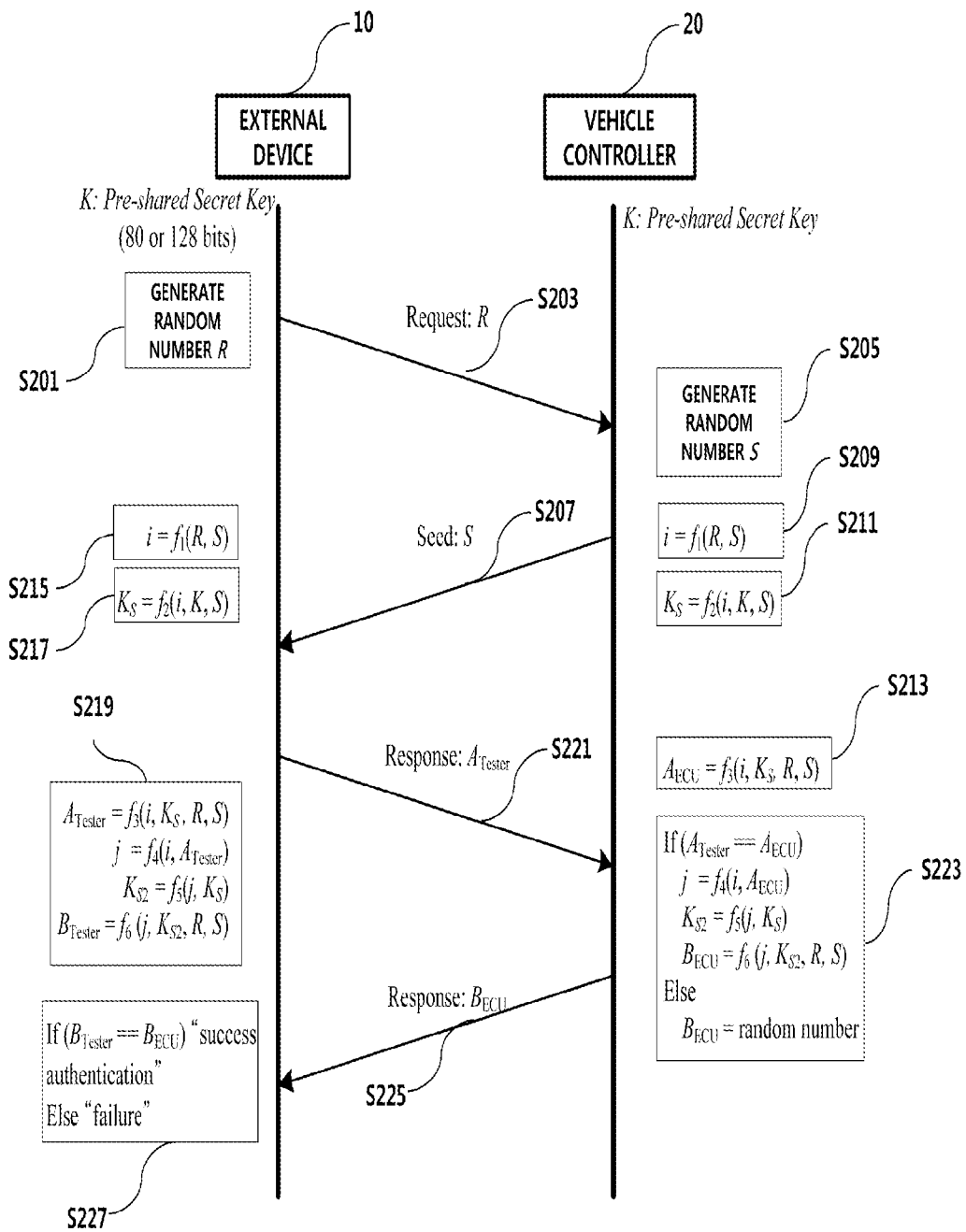
FIG. 2 is a flowchart illustrating a cross-authentication method according to embodiments of the present disclosure.

FIG. 2 is a flowchart illustrating a cross-authentication method according to embodiments of the present disclosure.

As shown in FIG. 2, the pre-shared secret key K may be maintained between the external device 10 and the vehicle controller 20. For example, the length of the secret key K may be any one of 80 bits or 128 bits. The external device may generate the random number R and transmit an authentication request message including the generated random number R to the vehicle controller 20 (S201 to 203).

The vehicle controller 20 generates and transmits the random number S to the external device 10, upon receiving the authentication request message (S205 to S207). At this time, the vehicle controller 20 may calculate the repeat count i using the first function having the random number R and the random number S as parameters (S209).

Subsequently, the vehicle controller 20 may input the repeat count i, the secret key K and the random number S as the parameters of the second function and generate the first session key Ks (S211).

The external device 10 may generate the repeat count i using the first function having the pre-generated random number R and the random number S received from the vehicle controller 20 as parameters, upon receiving the random number S which is the seed value (S215).

In addition, the external device 10 may input the repeat count i, the secret key K and the random number S as the parameters of the second function and generate the first session key Ks (S216).

The external device 10 may generate and transmit the first response key $A_{Tester}$ to the vehicle controller 20 using the third function having the repeat count i, the first session key Ks, the random number R and the random number S as the parameters (S219 to S221).

At this time, the external device 20 may generate the fourth response key $B_{Tester}$ using the generated first response key $A_{Tester}$. More specifically, the external device 10 may generate the repeat count j using a fourth function having the first response key $A_{Tester}$ and the repeat count i as parameters and generate the second session key $K_{S2}$ using a fifth function having the generated repeat count j and the pre-generated first session key Ks as parameters. Subsequently, the external device 10 may generate the fourth response key $B_{Tester}$ using a sixth function as the transformation variable j, the second session key $K_{S2}$, the random number R and the random number S as parameters.

The vehicle controller 20 may check whether the received first response key $A_{Tester}$ and the internally generated second response key $A_{ECU}$ are equal (S223). If the keys are equal as the checked result, the repeat count j may be generated using the fourth function having the first response key $A_{ECU}$ and the repeat count i as parameters and the second session key $K_{S2}$ may be generated using the fifth function having the generated repeat count j and the pre-generated first session key Ks as parameters. Subsequently, the vehicle controller 20 may generate the third response key $B_{ECU}$ using the sixth function having the transformation variable j, the second session key $K_{S2}$, the random number R and the random number S as parameters. If the keys are not equal as the checked result of step S223, the vehicle controller 20 may generate a random number using a predetermined random number generator. At this time, the generated random number may become the third response key $B_{ECU}$.

The vehicle controller 20 may transmit the third response key $B_{ECU}$ to the external device 10 (S225).

The external device 10 may determine whether the received third response key $B_{ECU}$ is equal to the pre-generated fourth response key $B_{Tester}$ (S227). If the keys are equal as the determination result, the external device 10 may determine that authentication of the vehicle controller 20 is successful. In contrast, if the keys are not equal as the determination result of step S227, the external device 10 may determine that authentication of the vehicle controller 20 has failed.

Figure 3:
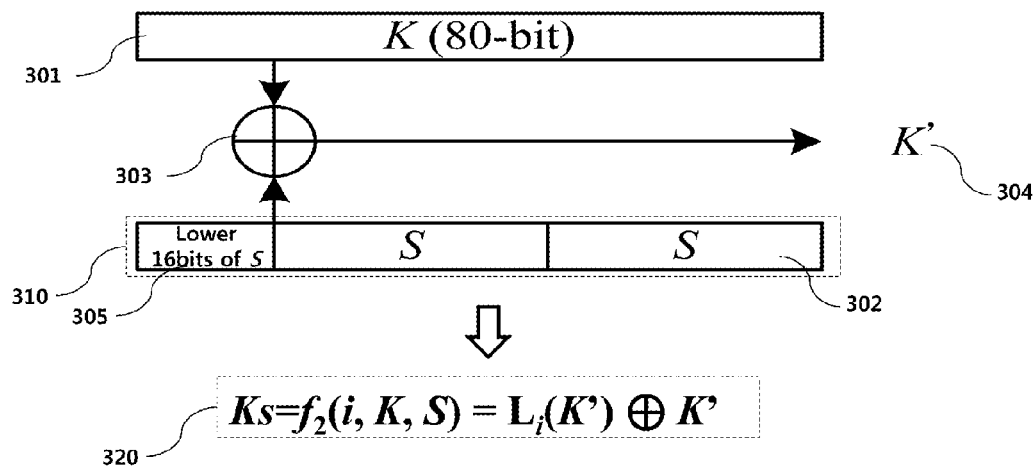
FIG. 3 is a diagram illustrating a session key generation method according to embodiments of the present disclosure.

FIG. 3 is a diagram illustrating a session key generation method according to embodiments of the present disclosure. More specifically, FIG. 3 shows the method of generating the first session key Ks if the length of the pre-assigned secret key K 301 of the external device 10 is 80 bits.

As shown in FIG. 3, the external device 10 may repeatedly concatenate the random number S302, which is the seed value received from the vehicle controller 20, by the length of the secret key K 301 and then generate K' 304 having a length of 80 bits via an XOR operation 303. For example, as denoted by reference numeral 310, two random numbers S302 and lower 16 bits of the random number S302 are concatenated to generate a bit sequence having a length of 80 bits. At this time, the external device 10 may perform a bitwise XOR operation of the generated bit sequence and the secret key K 301 to generate K' 304.

Subsequently, as denoted by reference numeral 320, the external device 10 may cyclic-shift the generated K' 304 to the left or the right by the repeat count i and then perform the bitwise XOR operation of the cyclic-shifted K' ($L_i(K')$) and K' 304, thereby generating the first session key Ks.

Figure 4:
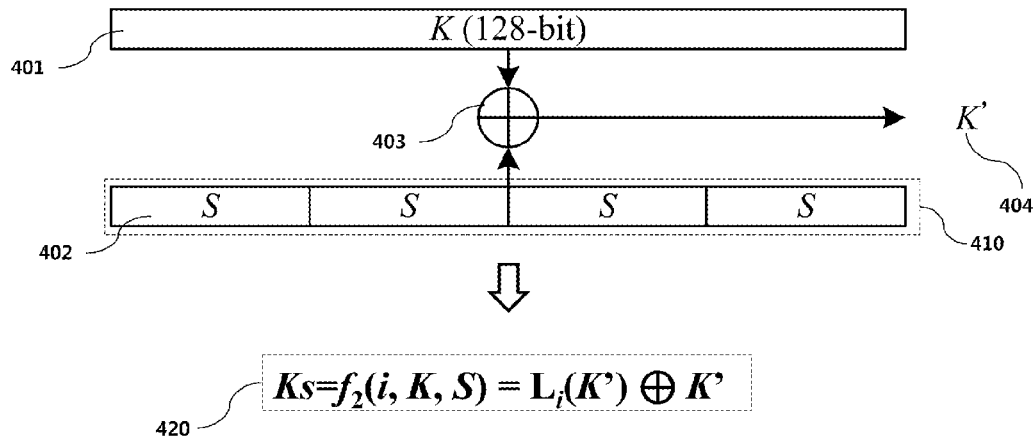
FIG. 4 is a diagram illustrating a session key generation method according to embodiments of the present disclosure.

FIG. 4 is a diagram illustrating a session key generation method according to embodiments of the present disclosure. More specifically, FIG. 4 shows the method of generating the first session key Ks if the length of the pre-assigned secret key K 401 of the external device 10 is 128 bits.

As shown in FIG. 4, the external device 10 may repeatedly concatenate the random number S402, which is the seed value received from the vehicle controller 20, by the length of the secret key K 401 and then generate K' 404 having a length of 128 bits via an XOR operation 403.

For example, as denoted by reference numeral 410, when the random number S402 has a length of 32 bits, four random numbers S402 may be concatenated to generate a bit sequence having a length of 128 bits. At this time, the external device 10 may perform a bitwise XOR operation of the generated bit sequence and the secret key K 401 to generate K' 404.

Subsequently, as denoted by reference numeral 420, the external device 10 may cyclic-shift the generated K' 404 to the left or the right by the repeat count i and then perform the bitwise XOR operation of the cyclic-shifted K' ($L_i(K')$) and K' 404, thereby generating the first session key Ks.

Although the procedure for generating the first session key Ks of the external device 10 has been described above, the second session key $K_{S2}$ according to the present disclosure may also be generated using the methods shown in FIGS. 3 to 4.

Figure 5:
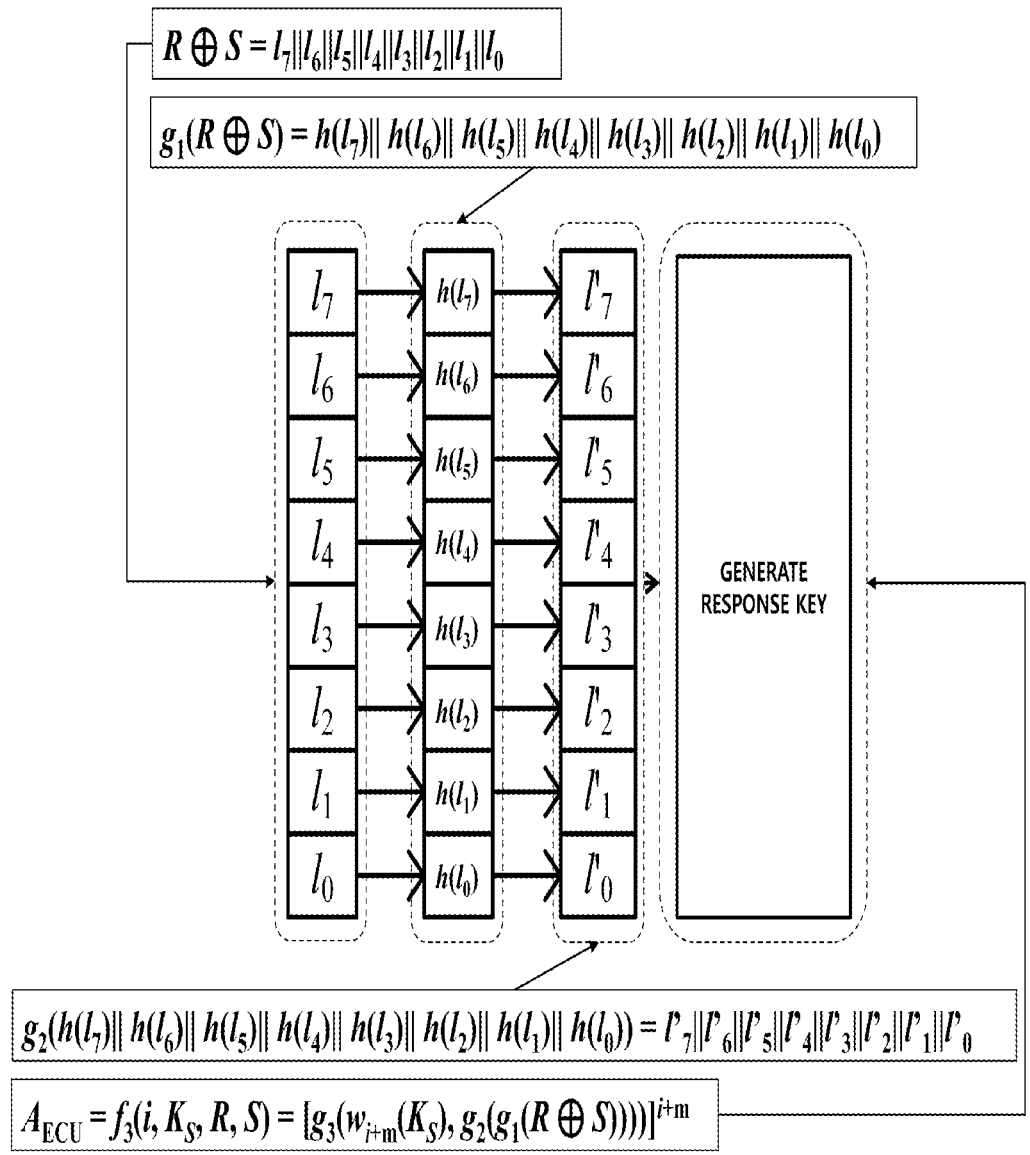
FIG. 5 is a diagram illustrating a response key generation procedure according to embodiments of the present disclosure.

FIG. 5 is a diagram illustrating a response key generation procedure according to embodiments of the present disclosure. More specifically, FIG. 5 is a diagram illustrating the procedure for generating the first response key $A_{Tester}$ of the external device 10.

As shown in FIG. 5, the external device 10 may perform the bitwise XOR operation of the internally generated random number R and the random number S received from the vehicle controller 20 as shown in Equation 5-1 below and generate 4-bit $l_i$. Here, i may have a value of 0 to 7.

$$R \oplus S = l_7 \| l_6 \| l_5 \| l_4 \| l_3 \| l_2 \| l_1 \| l_0$$ Equation 5-1:

Subsequently, the external device 10 may perform substitution of $l_i$ by referring to a set $h(l_i)$ as shown in Equation 5-2.

$$g_1(R \oplus S) = h(l_7) \| h(l_6) \| h(l_5) \| h(l_4) \| h(l_3) \| h(l_2) \| h(l_1) \| h \| h \quad (l_0),$$

Equation 5-2:

where $h(l_i) = \{9, 4, 10, 11, 13, 1, 8, 5, 6, 2, 0, 3, 12, 14, 15, 17\}$.

Thereafter, the external device 10 may multiply the substituted result $h(l_7) \| h(l_6) \| h(l_5) \| h(l_4) \| h(l_3) \| h(l_2) \| h(l_1) \| h(l_0)$ by a predetermined 4×4 matrix to generate $l'_7 \| l'_6 \| l'_5 \| l'_4 \| l'_3 \| l'_2 \| l'_1 \| l'_0$, as shown in Equation 5-3 below.

$$\begin{pmatrix} 1 & 1 & 2 & 3 \\ 1 & 2 & 3 & 1 \\ 2 & 3 & 1 & 1 \\ 3 & 1 & 1 & 2 \end{pmatrix} \begin{pmatrix} h(l_7) & h(l_6) \\ h(l_5) & h(l_4) \\ h(l_3) & h(l_2) \\ h(l_1) & h(l_0) \end{pmatrix} = \begin{pmatrix} l'_7 & l'_6 \\ l'_5 & l'_4 \\ l'_3 & l'_2 \\ l'_1 & l'_0 \end{pmatrix}$$

Equation 5-3

For example, referring to Equation 5-3 above, $l'_7$ may be calculated as $h(17) \oplus h(15) \oplus 2h(13) \oplus 3h(11)$.

Here, if a binary number x is (x3, x2, x1, x0), 2x and 3x may be defined as (x2,x1,x0⊕x3,x3). and (x2⊕X3,x1⊕X2, x0⊕x1⊕x3,x0⊕x3), respectively.

Finally, the external device 10 may generate the first response key $A_{Tester}$ as shown in Equation 5-4 below.

$$A\_Tester = [g_3(w_{i+4}(K_S), l_7 \| l_6 \| l_5 \| l_4 \| l_3 \| l_2 \| l_1 \| l_0)]^{i+4} = [W_{i+4} (K_S) \oplus l_7 \| l_6 \| l_5 \| l_4 \| l_3 \| l_2 \| l_1 \| l_0]^{i+4}$$

Equation 5-4:

where $w_j(K_S) = L_{37j \bmod (secret\ key\ size)}(K_S) \bmod 2^{32}$ may be defined. Here, Ks is the value of the first session key Ks calculated in FIG. 3 or 4 and j may be a value obtained by adding 4 to the repeat count i, where 4 is a minimum repeat count of a function $g_3$. In addition, $w_j(K_s)$ may be a function for cyclic-shifting the lower 32 bits of the first session key Ks to the left by 37 bits.

Although the minimum repeat count of the function $g_3$ for generating the response key is defined as 4, the present disclosure is not limited in this regard. Additionally, or in the alternative, the minimum repeat count may be differentially specified according to the security level required for the ECU and the kind of the ECU. For example, the minimum repeat count of an ECU having a high ECU level may be set to be higher than that of an ECU having a low ECU level. Although the session key generation procedure and the response key generation procedure of the external device 10 are described in FIGS. 3 to 5, the session key generation procedure and the response key generation procedure of the vehicle controller 20 may be performed using the same or similar methods.

Figure 6:
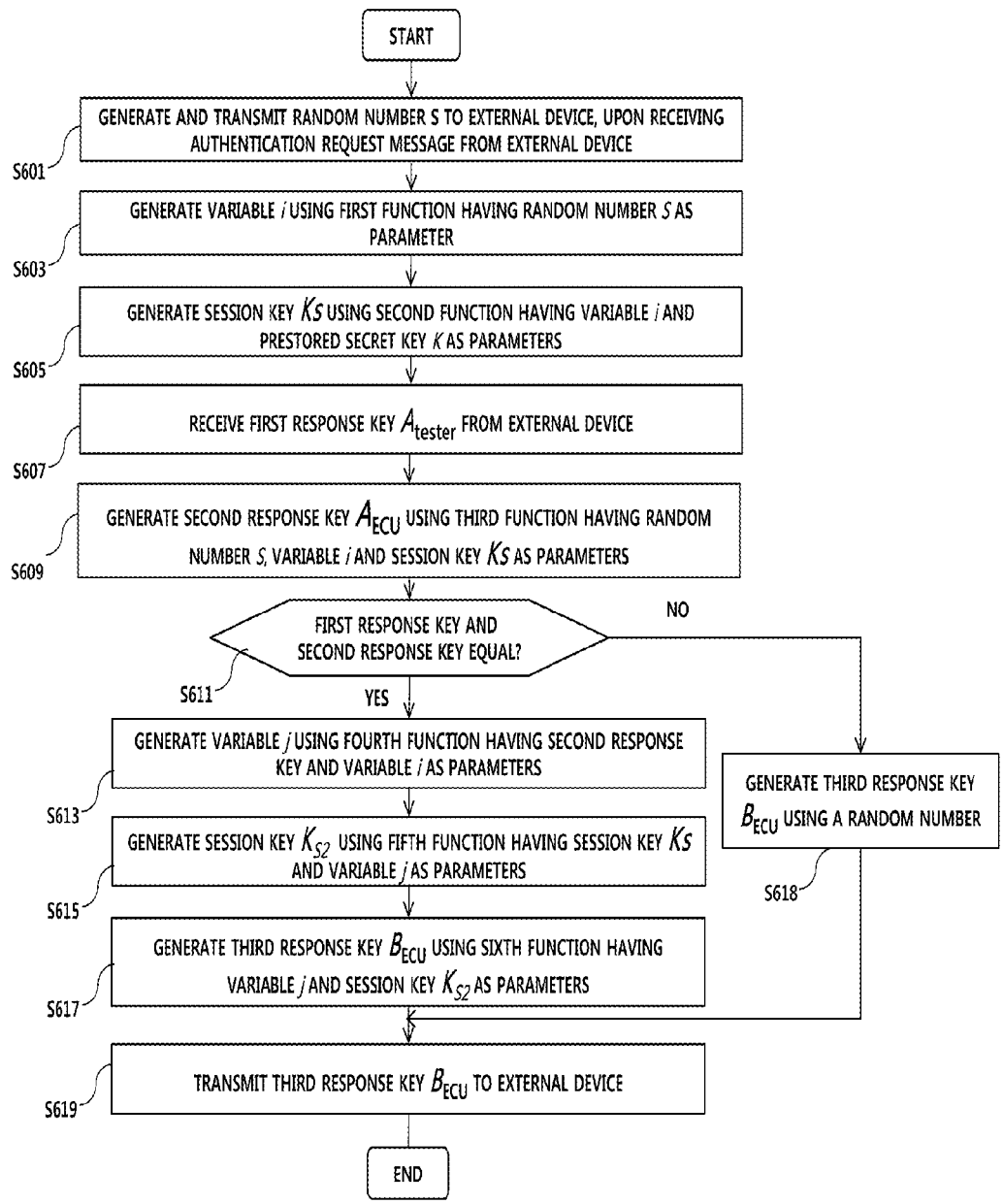
FIG. 6 is a flowchart illustrating a cross-authentication method in a vehicle controller according to embodiments of the present disclosure.

FIG. 6 is a flowchart illustrating a cross-authentication method in a vehicle controller according to embodiments of the present disclosure.

As shown in FIG. 6, the vehicle controller 20 may generate and transmit the random number S to the external device 10, upon receiving the authentication request message from the external device 10 (S601). The authentication request message may include the random number R generated by the external device 10.

The vehicle controller 20 may generate the variable i, which is the repeat count, using the first function having the random number S as a parameter and generate the first session key Ks using the second function having the generated variable i and the pre-stored secret key K as parameters (S603 to S605).

The vehicle controller 20 may generate the second response key $A_{ECU}$ using the third function having the random number S, the variable i and the first session key Ks as parameters, upon receiving the first response key $A_{Tester}$ from the external device 10 (S607 to S609). If the random number R is included in the authentication request message, the vehicle controller 20 may generate the first response key $A_{Tester}$ using the random number R in addition to the random number S, the variable i and the first session key Ks.

Subsequently, the vehicle controller 20 may determine whether the first response key $A_{Tester}$ is equal to the second response key $A_{ECU}$ (S611).

If the keys are equal as the checked result, the vehicle controller 20 may generate the variable j using the fourth function having the second response key $A_{ECU}$ and the variable i as parameters and generate the second session key $K_{S2}$ using the fifth function having the first session key Ks generated in step S605 and the variable j as parameters (S615).

Here, the fourth function may be a function for cyclic-shifting the second response key $A_{ECU}$ to the left by the variable i and may correspond to the first function. In addition, the fifth function may be a function for performing the session key generation procedure shown in FIG. 3 or 4 using the variable j, the session key Ks and the random number S as parameters and may correspond to the second function of step S605.

The vehicle controller 20 may generate the third response key $B_{ECU}$ using the sixth function having the random number S, the variable j and the second session key $K_{S2}$ and then transmit the generated third response key $B_{ECU}$ to the external device 10 (S617 to S619). It is noted that, if the random number R is included in the authentication request message, the vehicle controller 20 may further use the random number R to generate the third response key $B_{ECU}$.

Here, the sixth function may be a function for performing the response key generation procedure shown in FIG. 5 and may correspond to the third function of step S609.

If the keys are not equal to one another based on the determination result, the vehicle controller 20 may generate a random number via a predetermined random generator and set and transmit the generated random number to the external device 10 as the third response key $B_{ECU}$ (S618 to S619). In this case, the external device 10 may confirm that the internally generated fourth response key $B_{Tester}$ and the third response key $B_{ECU}$ received from the vehicle controller are different and determine that authentication of the vehicle controller 20 has failed.

Figure 7:
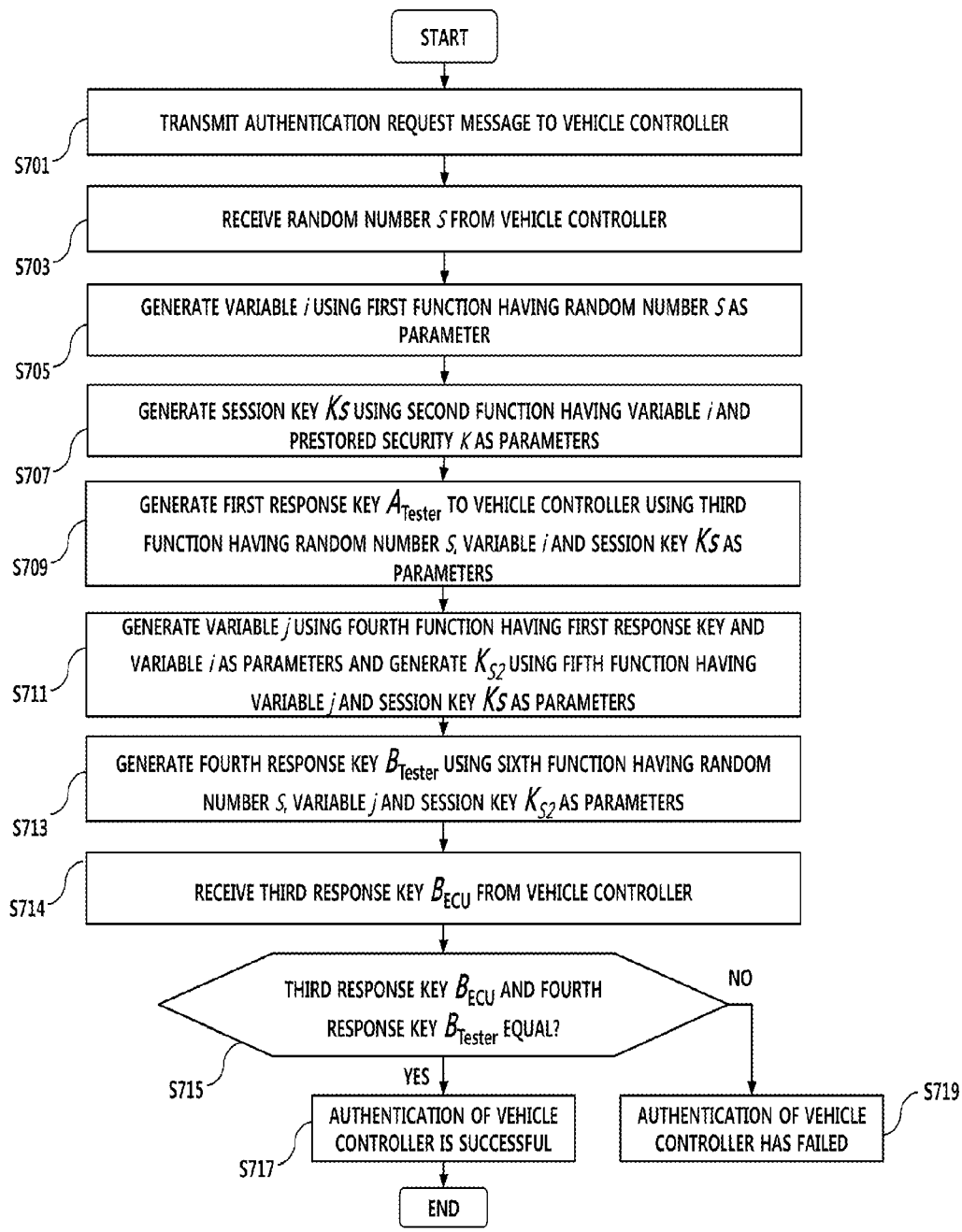
FIG. 7 is a flowchart illustrating a cross-authentication method in an external device according to embodiments of the present disclosure.

FIG. 7 is a flowchart illustrating a cross-authentication method in an external device according to embodiments of the present disclosure.

As shown in FIG. 7, the external device 10 may transmit the authentication request message to the vehicle controller 20 (S701). The authentication request message may include the random number R generated by the external device 10.

The external device 10 may generate the variable i, which is the repeat count, using the first function having the random number S as a parameter, upon receiving the random number S from the vehicle controller 20 (S703 to S705).

The external device 10 may generate the first session key Ks using the second function having the generated variable i, the pre-stored secret key K and the random number S as parameters (S707).

Subsequently, the external device 10 may generate the third response key $A_{Tester}$ using the third function having the random number S, the variable i and the first session key Ks as parameters and then transmit the generated third response key $A_{Tester}$ to the vehicle controller 200 (S709). If the random number R is included in the authentication request message, the external device 10 may further use the random number R to generate the first response key $A_{Tester}$.

The external device 10 may generate the variable j using the fourth function having the first response key $A_{Tester}$ and the variable i as parameters and generate the second session key $K_{S2}$ using the fifth function having the variable j and the first session key Ks as parameters. The fourth function may be a function for cyclic-shifting the first response key $A_{Tester}$ to the left by the variable i. In addition, the fifth function may be a function for performing the session key generation procedure shown in FIG. 3 or 4 using the variable j, the first session key Ks and the random number S, similarly to the second function of step S707.

The external device 10 may generate the fourth response key $B_{Tester}$ using the sixth function having the random number S, the variable j, and the second session key $K_{S2}$ as parameters (S713). Here, the sixth function may perform the response key generation procedure shown in FIG. 5 and correspond to the third function of step S709.

The external device 10 may determine whether the pre-generated fourth response key $B_{Tester}$ is equal to the third response key $B_{ECU}$, upon receiving the third response key $B_{ECU}$ from the vehicle controller 20 (S714 to S715).

If the fourth response key $B_{Tester}$ is equal to the third response key $B_{ECU}$, the external device 10 may determine that authentication of the vehicle controller 20 is successful (S717). In contrast, if the fourth response key $B_{Tester}$ is not equal to the third response key $B_{ECU}$, the external device 10 may determine that authentication of the vehicle controller 20 has failed (S719).

Exemplary effects of the method and apparatus according to the present disclosure are as follows:

First, it is possible to provide a method and apparatus for performing cross-authentication based on secret information. Second, it is possible to provide a method and apparatus for performing cross-authentication based on secret information, which is capable of performing cross-authentication based on a pre-shared secret key independent of a seed value. Third, it is possible to dynamically change a security level of a secret key and calculation complexity by dynamically changing a repeat count i according to a seed value. Fourth, it is possible to control a security level by providing secret keys having various lengths.

It will be apparent to those skilled in the art that the present disclosure can be implemented in other specific forms without departing from the spirit and scope of the present disclosure. Accordingly, the above detailed description is not to be construed as limiting the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. A method of performing cross-authentication in a vehicle controller interworking with an external device via a wired or wireless connection, the method comprising:

generating, by a random number generator of the vehicle controller, a random number S and transmitting the random number S to the external device in response to an authentication request message received from the external device;

generating, by a repeat count generator of the vehicle controller, a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;

generating, by a session key generator of the vehicle controller, a first session key Ks using a second function having the variable i and a pre-stored secret key K as parameters;

receiving, at the vehicle controller, a first response key from the external device;

generating, by a response key generator of the vehicle controller, a second response key using a third function having the random number S, the variable i and the first session key Ks as parameters;

authenticating, by an authenticator of the vehicle controller, the external device based on whether the first response key is equal to the second response key; and granting, by the vehicle controller, the external device access to the vehicle controller when the external device is authenticated.

2. The method according to claim 1, wherein the variable i is calculated by:

$$i=f_1(R, S)=L_S(R)+S \bmod 16,$$

where $L_S(R)$ is the function for cyclic-shifting the random number R by the specified number of bits of the random number S.

3. The method according to claim 1, wherein the random number S is further used to generate the first session key Ks.

4. The method according to claim 3, wherein the first session key Ks is generated by performing a bitwise XOR operation with respect to a first value generated by performing an XOR operation of the secret key K and the random number S and a second value generated by cyclic-shifting the first value by the variable i.

5. The method according to claim 4, wherein the first value is generated by repeatedly concatenating the random number S by a specified number of bits of the secret key K and then performing the bitwise XOR operation.

6. The method according to claim 1, wherein the random number R is further used to generate the second response key when the random number R is included in the authentication request message.

7. The method according to claim 6, wherein the second response key is calculated by:

$$f_3(i, K_S, R, S)=g(i+m, K_S, R, S)=[g_3(w_{i+m}(K_S), g_2(g_1(R \oplus S))))]^{i+m},$$

where m is a minimum repeat count predetermined based on a security level required for the vehicle controller.

8. The method according to claim 7, wherein R⊕S is calculated by:

$$R \oplus S = l_7 \| l_6 \| l_5 \| l_4 \| l_3 \| l_2 \| l_1 \| l_0,$$

where $l_j$ is a value obtained by dividing a result of performing a bitwise XOR operation of the random number R and the random number S by 4 bits.

9. The method according to claim 8, wherein $g_1(R \oplus S)$ is calculated by:

$$g_1(R \oplus S)=h(l_7)\|h(l_6)\|h(l_5)\|h(l_4)\|h(l_3)\|h(l_2)\|h(l_1)\|h(l_0),$$

where $h(l_j)$ is a substitution operation.

10. The method according to claim 9, wherein $h(l_j)$ is calculated by:

$(l_j)=\{9, 4, 10, 11, 13, 1, 8, 5, 6, 2, 0, 3, 12, 14, 15, 7\}$.

11. The method according to claim 9, wherein $g_2(g_1(R \oplus S)$ is calculated by a product of a pre-defined 4×4 matrix and 4-bit $h(l_j)$.

12. The method according to claim 11, wherein $g_2(g_1(R \oplus S)$ is calculated by:

$$\begin{pmatrix} 1 & 1 & 2 & 3 \\ 1 & 2 & 3 & 1 \\ 2 & 3 & 1 & 1 \\ 3 & 1 & 1 & 2 \end{pmatrix} \begin{pmatrix} h(l_7) & h(l_6) \\ h(l_5) & h(l_4) \\ h(l_3) & h(l_2) \\ h(l_1) & h(l_0) \end{pmatrix} = \begin{pmatrix} l'_7 & l'_6 \\ l'_5 & l'_4 \\ l'_3 & l'_2 \\ l'_1 & l'_0 \end{pmatrix}.$$

13. The method according to claim 12, wherein $2 h(l_j)$ and $3 h(l_j)$ are calculated by:

$2h(l_j)=(x2, x1, x0 \oplus x3, x3)$, and $3h(l_j)=(x2 \oplus x3, x1 \oplus x2, x0 \oplus x1 \oplus x3, x0 \oplus x3)$, when $h(l_j)$ is $(x3, x2, x1, x0)$.

14. The method according to claim 12, wherein $w_{i+m}(KS)$ is a function for cyclic-shifting lower 32 bits of the first session key Ks by a predetermined number of bits.

15. The method according to claim 14, wherein the third function is a function for performing a bitwise XOR operation of the cyclic-shifted 32-bit Ks and eight 4-bit blocks $l'_7 \| l'_6 \| l'_5 \| l'_4 \| l'_3 \| l'_2 \| l'_1 \| l'_0$.

16. The method according to claim 1, further comprising:
when the first response key is equal to the second response key,
generating a third response key using the second response key; and
transmitting the third response key to the external device.

17. The method according to claim 16, wherein the generating of the third response key comprises:
generating a variable j using the first function having the second response key and the variable i as parameters;
generating a second session key $K_{S2}$ using the second function having the variable j, the first session key Ks and the random number S as parameters; and
generating the third response key using the third function having the variable j, the second session key $K_{S2}$ and the random number S as parameters.

18. The method according to claim 1, further comprising:
transmitting a third response key, which is a random number, to the external device when the first response key is not equal to the second response key.

19. A method of performing cross-authentication in an external device interworking with a vehicle controller via a wired or wireless connection, the method comprising:
transmitting, by the external device, an authentication request message to the vehicle controller;
receiving, at the external device, a random number S from the vehicle controller;
generating, by a repeat count generator of the external device, a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;
generating, by a session key generator of the external device, a first session key Ks using a second function having the variable i and a pre-stored secret key K as parameters;
generating, by a response key generator of the external device, a first response key using a third function having the random number S, the variable i and the first session key Ks as parameters;
transmitting, by the external device, the first response key to the vehicle controller; and
accessing, by the external device, the vehicle controller when the external device is granted access to the vehicle controller in response to authentication of the external device.

20. The method according to claim 19, wherein the variable i is generated by:

$i = f_1(R, S) = L_S(R) + S \bmod 16$, where $L_S(R)$ is the function for cyclic-shifting the random number R by the specified number of bits of the random number S.

21. The method according to claim 19, wherein the random number S is further used as a parameter of the second function to generate the first session key Ks.

22. The method according to claim 21, wherein the first session key Ks is generated by performing a bitwise XOR operation with respect to a first value generated by performing an XOR operation of the secret key K and the random number S and a second value generated by cyclic-shifting the first value by the variable i.

23. The method according to claim 22, wherein the first value is generated by repeatedly concatenating the random number S by a specified number of bits of the secret key K and then performing the bitwise XOR operation.

24. The method according to claim 19, wherein the random number R is further used to generate the first response key when the random number R is included in the authentication request message.

25. The method according to claim 24, wherein the first response key is calculated by:

$f_3(i, K_S, R, S) = g(i+m, K_S, R, S) = [g_3(w_{i+m}(K_S), g_2(g_1(R \oplus S)))]^{i+m}$, where m is a minimum repeat count that is predetermined based on a security level required for the vehicle controller.

26. The method according to claim 25, wherein $R \oplus S$ is calculated by:

$R \oplus S = l_7 \| l_6 \| l_5 \| l_4 \| l_3 \| l_2 \| l_1 \| l_0$, where $l_j$ is a value obtained by dividing a result of performing a bitwise XOR operation of the random number R and the random number S by 4 bits.

27. The method according to claim 26, wherein $g_1(R \oplus S)$ is calculated by:

$g_1(R \oplus S) = h(l_7) \| h(l_6) \| h(l_5) \| h(l_4) \| h(l_3) \| h(l_2) \| h(l_1) \| h(l_0)$, where $h(l_j)$ is a substitution operation.

28. The method according to claim 27, wherein $h(l_j)$ is calculated by:

$(l_j)=\{9, 4, 10, 11, 13, 1, 8, 5, 6, 2, 0, 3, 12, 14, 15, 7\}$.

29. The method according to claim 27, wherein $g_2(g_1(R \oplus S))$ is calculated through a product of a pre-defined 4×4 matrix and 4-bit $h(l_j)$.

30. The method according to claim 29, wherein $g_2(g_1(R \oplus S))$ is calculated by:

$$\begin{pmatrix} 1 & 1 & 2 & 3 \\ 1 & 2 & 3 & 1 \\ 2 & 3 & 1 & 1 \\ 3 & 1 & 1 & 2 \end{pmatrix} \begin{pmatrix} h(l_7) & h(l_6) \\ h(l_5) & h(l_4) \\ h(l_3) & h(l_2) \\ h(l_1) & h(l_0) \end{pmatrix} = \begin{pmatrix} l'_7 & l'_6 \\ l'_5 & l'_4 \\ l'_3 & l'_2 \\ l'_1 & l'_0 \end{pmatrix}.$$

31. The method according to claim 30, wherein $2\,h(l_j)$ and $3\,h(l_j)$ are calculated by:

$$2h(l_j)=(x2, x1, x0 \oplus x3, x3),$$

and $$3h(l_j)=(x2 \oplus x3, x1 \oplus x2, x0 \oplus x1 \oplus x3, x0 \oplus x3),$$

when $h(l_j)$ is (x3, x2, x1, x0).

32. The method according to claim 30, wherein $w_{i+m}(KS)$ is a function for cyclic-shifting lower 32 bits of the first session key Ks by a predetermined number of bits.

33. The method according to claim 32, wherein the third function is a function for performing a bitwise XOR operation of the cyclic-shifted 32-bit Ks and eight 4-bit blocks $l'_7\|l'_6\|l'_5\|l'_4\|l'_3\|l'_2\|l'_1\|l'_0$.

34. The method according to claim 19, further comprising:
receiving a third response key from the vehicle controller;
generating a fourth response key using the first response key; and
authenticating the vehicle controller based on whether the third response key is equal to the fourth response key.

35. The method according to claim 34, wherein the generating of the fourth response key comprises:
generating a variable j using the first function having the first response key and the variable i as parameters;
generating a second session key $K_{S2}$ using the second function having the variable j and the first session key Ks as parameters; and
generating the fourth response key using the third function having the variable j, the second session key $K_{S2}$ and the random number S as parameters.

36. An apparatus for performing cross-authentication with an external device, the apparatus comprising:
a communication unit performing communication with the external device via a wired or wireless connection;
a random number generator generating a random number S in response to an authentication request message received from the external device;
a repeat count generator generating a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;
a session key generator generating a first session key Ks using a second function having the variable i and a pre-stored secret key K as parameters;
a response key generator generating a second response key using a third function having the random number S, the variable i and the first session key Ks as parameters, upon receiving a first response key from the external device; and
an authentication unit authenticating the external device based on whether the first response key is equal to the second response key,
wherein the apparatus grants the external device access to the vehicle controller when the external device is authenticated.

37. An apparatus for performing cross-authentication with a vehicle controller, the apparatus comprising:
a communication unit transmitting an authentication request message to the vehicle controller and receiving a random number S from the vehicle controller via a wired or wireless connection;
a repeat count generator generating a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;
a session key generator generating a first session key Ks using a second function having the variable i and a pre-stored secret key K as parameters;
a response key generator generating a first response key using a third function having the variable i, the first session key Ks and the random number S as parameters; and
an authentication unit determining whether the first response key transmitted to the vehicle controller is equal to a third response key received from the vehicle controller and authenticating the vehicle controller based on the determination,
wherein the apparatus accesses the vehicle controller when the apparatus is granted access to the vehicle controller in response to authentication of the apparatus S.

38. A non-transitory computer readable medium containing program instructions for performing cross-authentication in a vehicle controller interworking with an external device via a wired or wireless connection, the computer readable medium comprising:
program instructions that generate a random number S and transmit the random number S to the external device in response to an authentication request message received from the external device;
program instructions that generate a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;
program instructions that generate a first session key Ks using a second function having the variable i and a pre-stored secret key K as parameters;
program instructions that receive a first response key from the external device;
program instructions that generate a second response key using a third function having the random number S, the variable i and the first session key Ks as parameters;

program instructions that authenticate the external device based on whether the first response key is equal to the second response key; and program instructions that grant the external device access to the vehicle controller when the external device is authenticated.

39. A non-transitory computer readable medium containing program instructions for performing cross-authentication in a vehicle controller interworking with an external device via a wired or wireless connection, the computer readable medium comprising:

program instructions that transmit an authentication request message to the vehicle controller;

program instructions that receive a random number S from the vehicle controller;

program instructions that generate a variable i using a first function having the random number S as a parameter, wherein a random number R and the random number S are set as parameters of the first function to generate the variable i when the random number R is included in the authentication request message, and the variable i is calculated using a function for cyclic-shifting the random number R by a specified number of bits of the random number S;

program instructions that generate a first session key Ks using a second function having the variable i and a pre-stored secret key K as parameters;

program instructions that generate a first response key using a third function having the random number S, the variable i and the first session key Ks as parameters;

program instructions that transmit the first response key to the vehicle controller; and program instructions that access the vehicle controller when the external device is granted access to the vehicle controller in response to authentication of the external device.

* * * * *